(12) United States Patent
Lee et al.

(10) Patent No.: US 6,400,660 B1
(45) Date of Patent: *Jun. 4, 2002

(54) OPTICAL DISK AND APPARATUS FOR READING THE SAME BASED UPON THE LENGTH OF A MIRROR REGION

(75) Inventors: Kyung-geun Lee, Seoul; Myoung-june Kim, Suwon; Du-seop Yoon, Suwon; Young-man Ahn, Suwon, all of (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,890

(22) Filed: May 5, 1998

(30) Foreign Application Priority Data

Oct. 28, 1997 (KR) .......................................... 97-55560
Oct. 28, 1997 (KR) .......................................... 97-55561

(51) Int. Cl.⁷ ................................................. G11B 7/00
(52) U.S. Cl. ............................... 369/44.26; 369/47.27; 369/53.24
(58) Field of Search ........................... 369/44.27, 44.28, 369/32, 44.26, 275.3, 53.24

(56) References Cited

U.S. PATENT DOCUMENTS 3,919,697 A * 11/1975 Walker ........................ 369/53
4,472,750 A * 9/1984 Klummp et al. ........... 360/78.1
5,444,682 A * 8/1995 Yamada et al. ................ 369/32
5,508,995 A * 4/1996 Moriya et al. ............ 369/275.3
6,034,937 A * 1/1998 Kumagami ................... 369/59

FOREIGN PATENT DOCUMENTS

| EP | 740291 | * 10/1996 | .................. 369/32 |
| EP | 757343 | * 2/1997 | .................. 369/32 |
| GB | 2307770 | * 6/1997 | .................. 369/32 |
| JP | 9-161274 | 6/1997 | |

* cited by examiner

Primary Examiner—Nabil Hindi
(74) Attorney, Agent, or Firm—Staas & Halsey LLP

(57) ABSTRACT

A high-density optical disk includes lands and grooves which are alternately formed to different depths around tracks of the optical disk and on each of the lands and grooves user information marks are formed. A mirror region is formed at a region of a change between a land and a groove, to guide a beam to sequentially access from a track to an adjacent next track, wherein the land and the groove are formed next to the mirror region, and a change between the land and the groove can be recognized by the detection of the mirror region. An apparatus for reading the high-density optical disk includes an optical detector to detect a beam reflected by the optical disk on which the mirror region is formed, and converting the detected beam into an electrical signal; a signal processor including a mirror region detector to process the electrical signal to detect the mirror region, and a tracking servo controller to receive the electrical signal from the mirror region detector and to make an appropriate tracking control on the tracks according to a change between the land and the groove.

6 Claims, 4 Drawing Sheets

US 6,400,660 B1

OPTICAL DISK AND APPARATUS FOR READING THE SAME BASED UPON THE LENGTH OF A MIRROR REGION

BACKGROUND OF THE INVENTION

1. Field of the Invention

The present invention relates to a high-density optical disk and an apparatus for reading the same, and more particularly, to a high-density optical disk and an apparatus for reading the same by controlling a tracking servo depending on the change between a land and a groove by detection of a mirror area.

2. Description of the Related Art

An optical disk is a non-contact type recording medium, and has developed to achieve high capacity, high speed and high density. In particular, the high-density optical disk medium such as a digital versatile disk-random access memory (DVD-RAM) is used to record and read video information of multimedia or high quality TV. In general, the optical disk has a multitude of tracks which are spirally connected. Referring to FIG. 1, each track has a groove or a land as a user information region. The lands 1LL and 1LR and the grooves 1GL and 1GR form alternate tracks on which information marks 2 are formed. Each track forms a concentric circle which is partially discontinued. A mirror region 19 is formed at the discontinued portions of the concentric circles. A typical guide means 18 formed on the mirror region 19 guides a beam to sequentially access adjacent tracks.

The type of track accessed by the beam is changed according to the track. That is, the type of track is changed from the land 1LL to the groove 2GR or from the groove 1GL to the land 1LR. Therefore, the type of track is identified by information recorded on a header region 14 which is conventionally formed adjacent to the mirror region 19. A tracking servo controller performs a control operation such as a change of the polarity of a tracking error signal according to the identified type of each track.

However, the conventional method which identifies the types of track by using information recorded on the header region 14 results in a loss of the information recording capacity of an optical disk. That is, the special header region 14 must be formed in each track of the optical disk, so user information cannot be recorded on the disk space used by the header region.

Also, since pits 4 representing the types of tracks must be formed on the header region 14, additional processes are required in the manufacture of the optical disk.

SUMMARY OF THE INVENTION

To solve the above problems, it is an object of the present invention to provide a high-density optical disk on which a lot of information can be recorded, and an apparatus for reading the same.

Additional objects and advantages of the invention will be set forth in part in the description which follows and, in part, will be obvious from the description, or may be learned by practice of the invention.

Accordingly, to achieve the above and other objects of the present invention, there is provided a high-density optical disk including a land and a groove which are alternately formed to different depths around tracks of a disk and on each of which user information marks are formed; and a mirror region formed at a change between the land and the groove, to guide a beam to sequentially access from a track to an adjacent next track, wherein the land and the groove are formed next to the mirror region, and a change between the land and the groove can be recognized by the detection of the mirror region.

In addition, there is provided an apparatus for reading the high-density optical disk, including an optical detector to detect a beam reflected by an optical disk on which a mirror region is formed between a land and a groove that are alternately formed around the tracks of the optical disk, and converting the detected beam into an electrical signal; a signal processor including a mirror region detector to process the electrical signal to detect the mirror region; and a tracking servo controller to receive the electrical signal from the mirror region detector and to make an appropriate tracking control on the tracks according to a change between the land and the groove.

BRIEF DESCRIPTION OF THE DRAWINGS

The above and other objects and advantages of the present invention will become more apparent by describing in detail a preferred embodiment thereof with reference to the attached drawings in which.

DESCRIPTION OF THE PREFERRED EMBODIMENT

Figure 1:
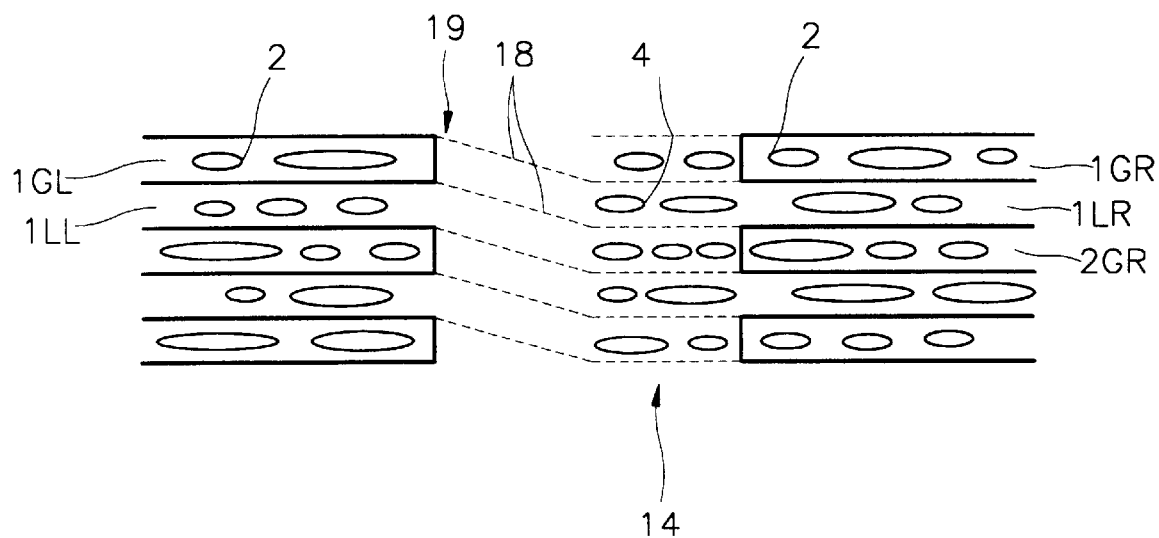
FIG. 1 shows part of a conventional high-density optical disk.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
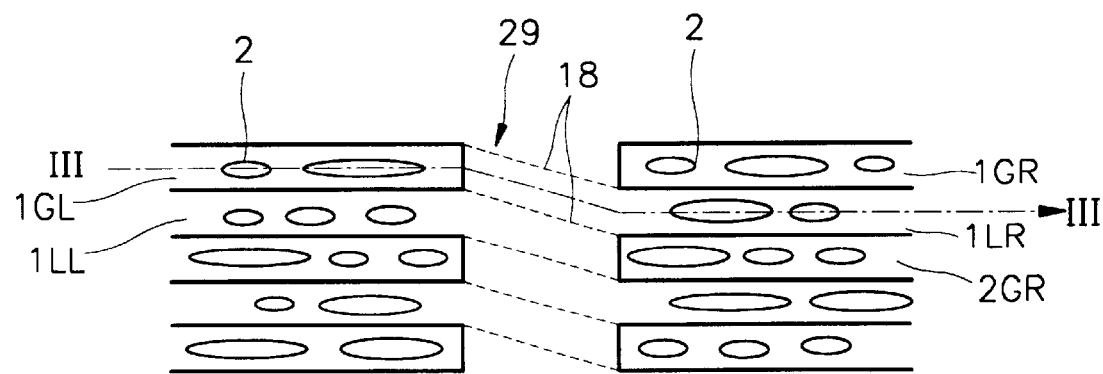
FIG. 2 shows part of a high-density optical disk according to an embodiment of the present invention.

Referring to FIG. 2, a high-density optical disk according to an embodiment of the present invention includes lands 1LL and 1LR and grooves 1GL and 1GR formed alternately around tracks. Marks 2 are formed on the lands 1LL and 1LR and the grooves 1GL and 1GR. A mirror region 29 having no marks and no pits is formed in the region between the lands 1LL and 1LR and the grooves 1GL and 1GR. The mirror region 29 guides a beam from a specific track to an adjacent next track by typical guide means 18 formed thereon, but does not have other information such as the type of track or positional information.

Figure 3:
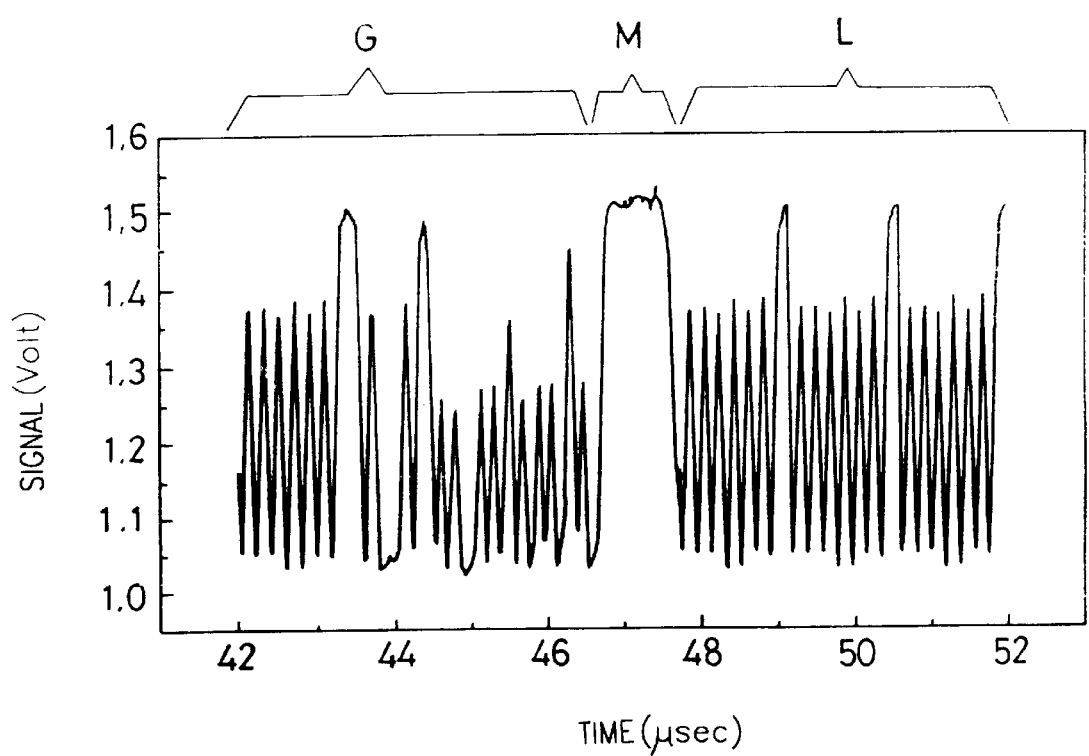
FIG. 3 is a graph showing an analog radio frequency (RF) signal detected when a beam is scanned along a line III—III of FIG. 2.

Meanwhile, when a beam accesses from a particular track to an adjacent next track, the type of track changes from the groove 1GL to the land 1LR or from the land 1LL to the groove 2GR. FIG. 3 shows a signal which is extracted as a beam scans a track along the line III—III shown in FIG. 2. That is, when the beam scans the groove 1GL, the mirror region 29, and the land 1LR, in sequence, a mark signal G of the track, a mirror region signal M and a mark signal L of the track are sequentially detected as shown in FIG. 3.

Here, the length of the mirror region 29 should be longer than the length of a long address mark, as will be described later. Accordingly, the mirror region signal M is easily distinguished and detected since it has a signal aspect different from the mark signals G and L of the track, i.e., a direct current component of predetermined length. That is, the mirror region 29 must have the minimum length which can be detected.

However, if the mirror region 29 is unnecessarily long, the user information recording space is reduced, and a tracking error is likely since the mirror region 29 loses synchronism while the mirror region 29 is accessed. Thus, it is preferable that the mirror region 29 has a length within a predetermined range. According to an the length of the mirror region 29 is preferably between the lengths corresponding to the volumes of 1 byte and 3 bytes of user information.

A process for scanning an optical disk according to the present invention will be described as follows. That is, while the groove 1GL is scanned along the line III—III of FIG. 2, the marks 2 on the groove 1GL are read out. After the scanning of the groove 1GL is complete, the mirror region 29 having a predetermined length is detected. When the mirror region 29 is detected, a signal processor 320 (see FIG. 4) of an optical pickup generates a flag signal indicating that the region to be accessed by the beam will be changed to the land 1LR. Then, a tracking servo converts an optical pickup to be suitable for accessing the land 1LR, and performs tracking control depending on the access of the land 1LR. Likewise, when the beam scans the disk along the track from the land 1LL to the groove 2GR, tracking control is performed in a similar way to that described above.

Accordingly, in the high-density optical disk according to the embodiment of the present invention, although there is no special recorded information for the change between the groove and the land, the change is achieved by the detection of the mirror region 29. For example, a tracking servo controller 330 of FIG. 4, which receives the flag signal generated by the detection of the mirror region 29, operates a tracking servo appropriately for each type of track.

Figure 4:
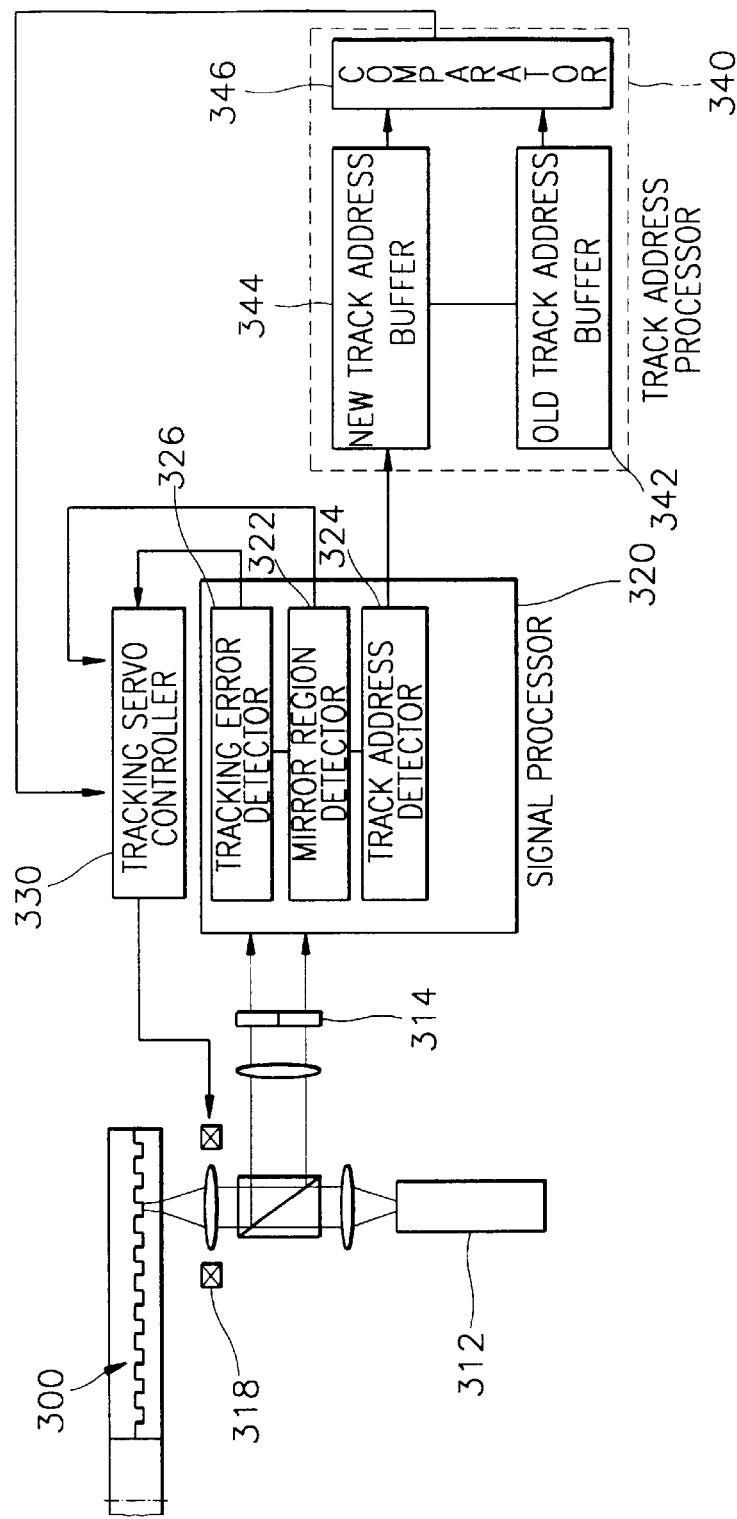
FIG. 4 is a schematic block diagram of an apparatus for reading a high-density optical disk according to the embodiment of the present invention.

FIG. 4 shows an apparatus for reading an optical disk according to the embodiment of the present invention.

In general, a beam generated from an optical diode 312 irradiates an optical disk 300 via an optical path. An optical detector 314 detects the beam reflected from the optical disk 300 and converts the detected beam to an electrical signal. The converted electrical signal is input to the signal processor 320.

The signal processor 320 amplifies the converted electrical signal, which is an analog radio frequency signal, and converts the amplified signal into a signal suitable for a tracking and focusing servo. The analog radio frequency signal amplified in the signal processor 320 has the mark signals G and L and the mirror region signal M, as shown in FIG. 3. The signal processor 320 can include a tracking error detector 326, a mirror region detector 322 and a track address detector 324.

The mirror region detector 322 detects the mirror region 29 using the fact that the mirror region signal M has different properties from the mark signals G and L of the track, for example, by using a typical signal processing method such as a method of detecting a direct current component having a predetermined length or more in the analog radio frequency signal. Thus, it is preferable that the direct current component signal has the minimum length which is required to be detected for the mirror region 29. The mirror region detector 322 generates a flag signal upon detecting the mirror region 29, and then applies the flag signal to the tracking servo controller 330. The tracking servo controller 330 performs a tracking control operation such as changing the polarity of a tracking error signal in conformity of the type of track accessed by the beam. Here, the tracking servo controller 330 controls the tracking servo by operating a voice coil 318 to compensate for a tracking error detected by the tracking error detector 326. A track address detector 324 detects the address of each track by reading out information recorded in the marks of each track.

Meanwhile, while the mirror region 29 is accessed, the tracks of the optical disk may be accessed out of sequence due to external shocks. In preparation for the above case, it is preferable that a track address processor 340 is further included. The mirror region detector 322 detects a mirror region 29 and informs the track address detector 324 that a mirror region 29 was detected. Then, the track address detector 324 reads out the address of a new track following the mirror region 29. The new track address detected by the track address detector 324 is output to the track address processor 340, and the track address processor 340 determines whether the track is properly accessed.

The track address processor 340 includes an old track address buffer 342, a new track address buffer 344, and a comparator 346. Here, "old track" denotes the track located before the mirror region 29, which is already accessed, and "new track" denotes the track following the mirror region 29, which is to be newly accessed. Accordingly, the old track address buffer 342 stores the addresses of the old tracks accessed until now, and the new track address buffer 344 stores the addresses of the new tracks following the mirror region 29. The comparator 346 compares the addresses stored in the buffers 342 and 344 with each other.

When a new track is accessed, the track address processor 340 receives the address of the track detected by the track address detector 324 and stores the same in the new track address buffer 344. The comparator 346 compares the track address stored in the new track address buffer 344 with that stored in the old track address buffer 342 to find out whether the two track addresses are adjacent to each other. For example, if the new track address is greater than the old track address by one, it is recognized that the new track is properly accessed. Otherwise, it is determined that the tracks of the optical disk are not sequentially accessed and a wrong track is accessed instead. Thus, the tracking servo is controlled to allow the beam to access the right track.

Here, the comparison by the comparator 346 can be carried out by a central processing unit of a microcomputer in a disk player. The functions of the track address buffers 342 and 344 can be performed by a common register.

Figure 5:
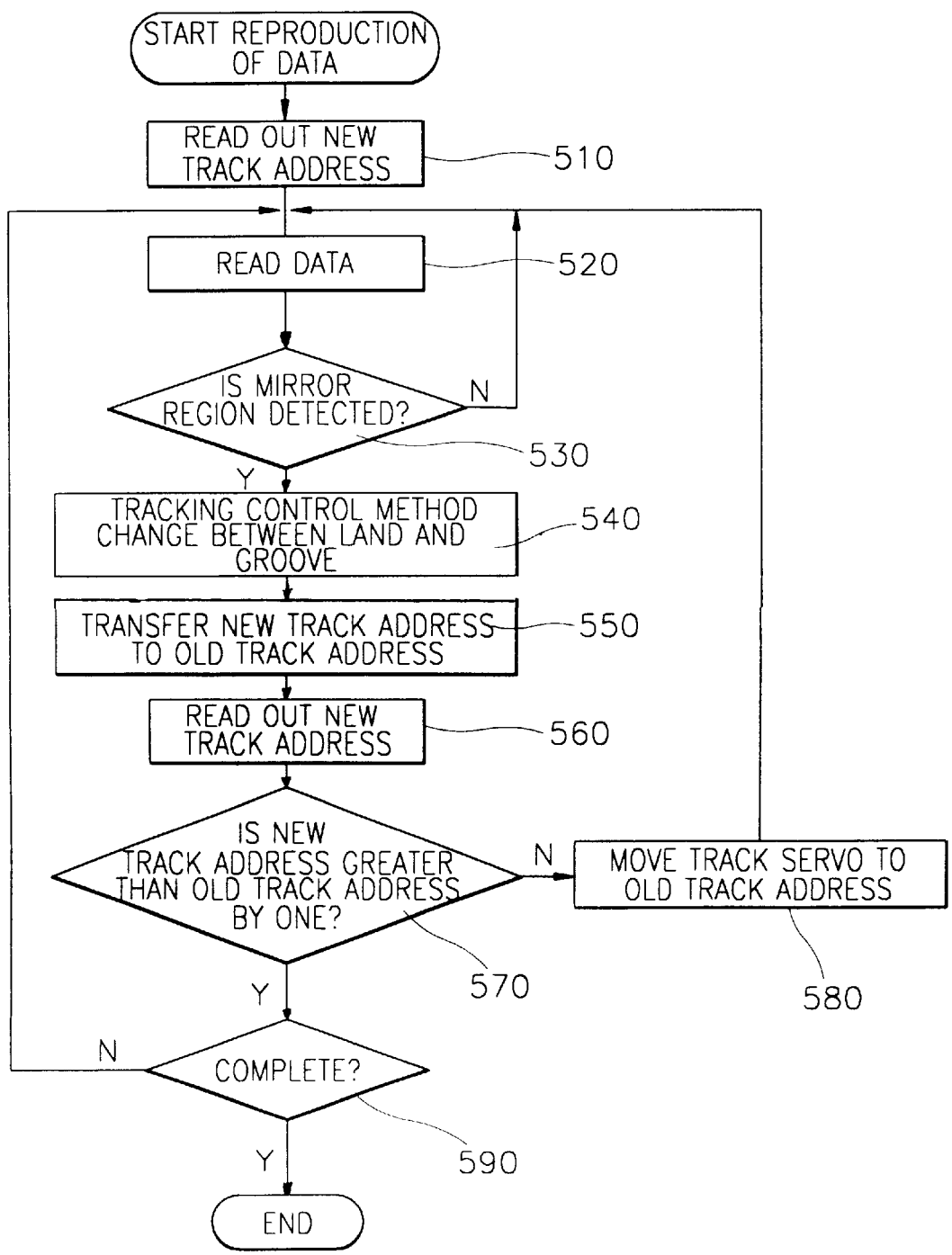
FIG. 5 is a flowchart illustrating a process in which the high-density optical disk shown in FIG. 2 is read by the high-density optical disk reading apparatus shown in FIG. 4 according to the embodiment of the present invention.

A process of sequentially accessing tracks by using the track address processor 340 regardless of external shocks will now be described with reference to FIG. 5.

When reading of data recorded on the optical disk 300 starts, first, the address of a new track is read out from marks formed on a land or groove along a track, in step 510. The track is consecutively accessed, and data recorded on the track is read, in step 520. After all the data recorded on the track is read, the signal processor 320 of FIG. 3 detects the mirror region 29 existing at the end portion of the track, in step 530.

After the mirror region 29 is detected, an adjacent next track following the mirror region 29 begins to be accessed, and the type of track is changed. Accordingly, a tracking control method change between the land and the groove is made in conformity with the type of track to be accessed, to perform a suitable tracking servo control, in step 540.

The new track address stored in the new track address buffer 344 of FIG. 3 is transferred to the old track address buffer 342 of FIG. 3 to prepare for reading out the address of another new track, in step 550. As the beam accesses a new track following the mirror region 29, the address of the new track is read out, in step 560. Then, it is determined whether the read new track address is proper, i.e., the address adjacent to the old track address, in step 570. If the new track address is not proper, a tracking servo is moved to a suitable address, i.e., an old track address, in step 580. Then, the procedure is fed back to the step 520 of reading data. Accordingly, even though the tracks were not sequentially accessed due to external shocks, for example, correction is made to access the proper track again. When the address of the new track accessed is proper, the previous steps are repeated until the data reading is completed, in step 590.

As described above, the high-density optical disk according to the present invention can perform appropriate tracking control without special recorded information on the change of the type of track to be accessed between a land and a groove. Thus, since a special header region for identifying the type of a track is not required in each track, the region capable of recording user information increases by the same area. Therefore, the disk capacity is substantially increased.

Furthermore, since a special header signal indicating the changes between the groove and the land need not be recorded on the disk, it is easier to manufacture the optical disk.

What is claimed is:

1. An apparatus for reading an optical disk having mirror regions respectively formed between lands and grooves that are alternately formed in tracks, wherein each mirror region separates one of the tracks from an adjacent next one of the tracks, the apparatus comprising:

an optical detector to irradiate a light beam on the optical disk and detect the light beam reflected from the optical disk, to generate a data signal; and a processing unit to detect a region on the optical disk based on the generated data signal and determine whether the detected region is a mirror region based on whether the detected region is at least a predetermined length, and perform a tracking control of said optical detector with regard to the tracks based upon the determined mirror region.

2. The apparatus as claimed in claim 1, wherein said processing unit comprises:

a tracking error detector to detect errors in the data signal;

a mirror region detector to detect the region on the optical disk based on the generated data signal and determine whether the detected region is the mirror region based on whether the detected region is at least the predetermined length; and a tracking servo controller to control a tracking servo of said optical detector based on the detected errors and the determined mirror region.

3. The apparatus as claimed in claim 2, further comprising:

a track address detector to detect addresses of each track based upon information recorded in the each track; and a track address processor to compare the address of the one track with a next read track to ensure that the next read track is the adjacent next track.

4. The apparatus as claimed in claim 3, wherein said tracking servo controller controls the tracking servo so that said optical detector finds the adjacent next track if the next read track is not the adjacent next track.

5. The apparatus as claimed in claim 3, wherein said tracking servo controller controls the tracking servo so that said optical detector returns to the one track and begins again to search for the adjacent next track if the next read track is not the adjacent next track.

6. The apparatus as claimed in claim 1, wherein said processing unit determines whether the detected region is a mirror region based solely on the portions of the data signal which are indicative of the each mirror region being at least the predetermined length.

* * * * *